UNITED STATES PATENT OFFICE.

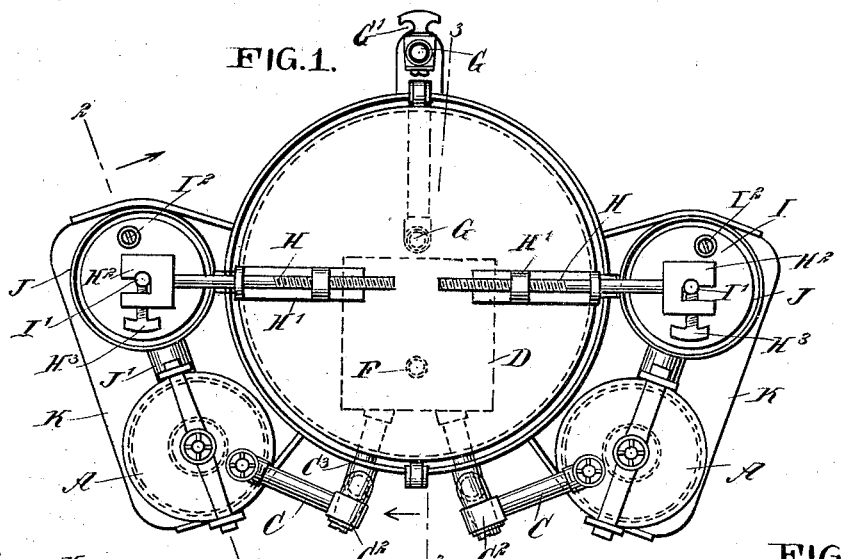
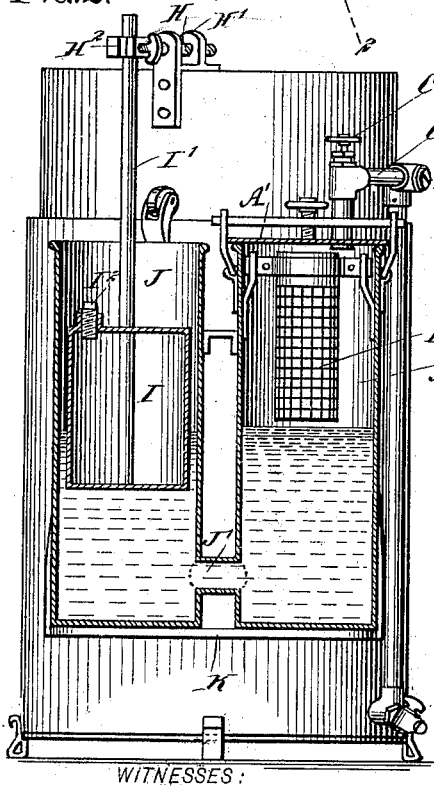
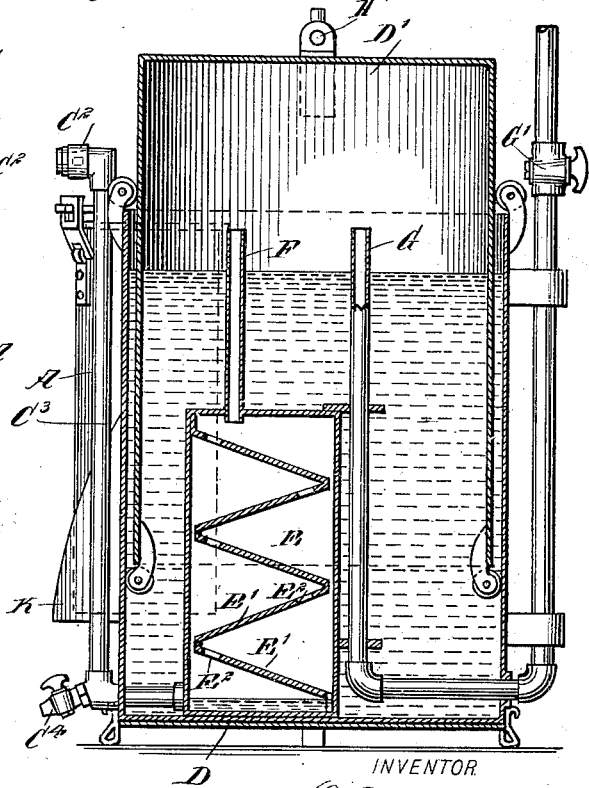

OLIVER DERVIN FRY, OF ALTOONA, PENNSYLVANIA.

ACETYLENE-GAS GENERATOR.

SPECIFICATION forming part of Letters Patent No. 652,098, dated June 19, 1900.

Application filed October 24, 1898. Serial No. 694,434. (No model.)

*To all whom it may concern:*

Be it known that I, OLIVER DERVIN FRY, of Altoona, in the county of Blair and State of Pennsylvania, have invented a new and Improved Acetylene-Gas Generator, of which the following is a full, clear, and exact description.

The object of the invention is to provide a new and improved acetylene-gas generator which is simple and durable in construction, automatic in operation, and not liable to get out of order.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement. Fig. 2 is a transverse section of the same on the line 2 2 in Fig. 1, and Fig. 3 is a similar view of the same on the line 3 3 in Fig. 1.

The improved acetylene-gas generator is provided with a generator-casing A, adapted to contain the water for engaging and decomposing the calcium carbid contained in the basket B, held removably on suitable supports within the upper end of the casing A. The removable top or lid A' of the casing A is held on a pipe C for the passage of the gas generated by the water coming in contact with the calcium carbid, said pipe being provided with a valve C' and a swing-joint $C^2$, connected with a pipe $C^3$, passing into the tank of a gasometer D, having the usual bell D', moving in the water contained in the gasometer-tank. The pipe $C^3$ opens into the lower end of a separator E contained within the gasometer-tank and submerged in the water contained therein to separate any moisture from the gas, the moisture in condensing flowing from the separator E through the lower portion of the pipe $C^3$ to a valve $C^4$ for discharging the accumulating moisture from time to time. In the separator E is fitted loosely a transversely-disposed zigzag partition E', each wing of which extends nearly from one side of the separator to the other, an opening $E^2$ being at or near the upper end, so that the gas passing from the generator-casing A through the pipes C $C^3$ into the separator passes in a zigzag form through the latter to separate any moisture that may be contained in the gas. The partition E' is loosely fitted in the separator to allow the separated moisture to flow down the inclined wings of the partitions and drop off the lower ends thereof to the bottom of the separator-casing, from which the moisture can be drawn off from time to time by the valve-faucet $C^4$ in the pipe $C^3$ at the outside of the gasometer. The gas finally passes from the top of the separator through a pipe F into the bell D' of the gasometer, which in consequence of the gas rises in the usual manner and falls when more gas is withdrawn from the bell than enters the same. A standpipe G leads from the bell D' above the water contained in the gasometer to carry the gas to the burners or other devices for consumption, the pipe G being provided with a suitable valve G' to regulate the outflow of the gas from the gasometer.

As illustrated in the drawings, two generator-casings A are employed and connected with the single gasometer D; but it is evident that only one such generator-casing or more than two may be employed, if desired.

On the top of the bell D' are secured bearings H', each carrying a screw-rod H, formed on its outer end with a head $H^2$ for engaging a rod I', fastened in place on the head by a set-screw $H^3$, said rod being disposed vertically and having a displacer I secured on the lower end of the rod. The displacer I is preferably in the form of a closed vessel moving loosely in the receptacle J, connected at or near its lower end by a pipe J' with the lower portion of the generator-casing A, so that the water contained therein stands at a level with the water contained in the receptacle J. Normally the basket B is arranged with its lower end above the level of the water in the generator-casing A; but when the previously-generated gas is withdrawn from the gasometer-bell D' to such an extent that the latter sinks and carries the displacer I with it then the displacer in moving downward in the water contained in the receptacle J causes a rise of the level of the water in both the receptacle J and the generator-casing A, so that the water in the latter finally moves in contact with the basket B and the calcium carbid contained therein to cause a decomposition of the calcium carbid and a consequent generation of gas, which flows from the generator-casing by way of the pipes C C³ and the separator E and pipe F to the bell D' to lift the same accordingly. When the bell D' rises, the displacer I moves bodily with the bell, and consequently up in the water contained in the receptacle J, to cause the water in the latter and that in the generator-casing A to fall. The water in falling in the generator-casing moves out of engagement with the calcium carbid, and further generation of the gas ceases until the amount stored in the bell D' is withdrawn for consumption through the pipe G.

From the foregoing it will be seen that the operation is completely automatic and no attention is required on the part of the operator except to charge the basket B with the necessary calcium carbid in the usual manner.

The screw-rod H screws in the bearing H', so as to bring the head H² in proper relation to the rod I' and hold the displacer I in proper position relatively to the inner wall of the receptacle J—that is, out of contact with the walls—to insure a proper working of the apparatus. Furthermore, the displacer I by the rod I' can be adjusted up or down in the receptacle J by fastening the rod I' higher up or lower down in the head H². By this construction the amount of gas stored in the bell D' can be regulated to supply the desired number of burners with the necessary amount of gas.

The displacer I is preferably provided with a filling-plug I² for filling the displacer with water to increase the weight on the bell D', and consequently to increase the pressure on the gas within the bell.

The generator A and the receptacle J, connected with the generator-casing, are preferably set on a suitable bracket attached to the well of the gasometer, as plainly shown in the drawings, but other supports may be provided.

By having the lid or cover A' of the generator-casing attached to the swing-pipe C it is only necessary to unlock the lid and then swing the pipe C, with the lid thereon, upward to permit of conveniently removing the basket from the casing for refilling, cleaning, and other purposes. If only one generator is used, weights are used on the displacer for the other generator to properly counterbalance the gasometer-bell to obtain the desired pressure.

Having thus fully described my invention, I claim as new and desire to secure by Letters Patent—

1. An acetylene-gas generator, provided with a gasometer, a generator adapted to contain water and calcium carbid, a receptacle adapted to contain water and communicating with the generator, a displacer movable in said receptacle to move the water in and out of contact with the calcium carbid, and a support for the said displacer carried by the gasometer-bell and adjustable horizontally, the said displacer being vertically adjustable in said support, substantially as shown and described.

2. An acetylene-gas generator, comprising a gasometer, a gas-generator adapted to contain water and calcium carbid, a support for calcium carbid held in said generator, a receptacle containing water and communicating with the generator, a screw-rod secured in bearings on the top of the gasometer-bell and formed at its outer end with a head, the said rod being adjustable horizontally in its bearings, and a displacer comprising a vessel arranged in the said water-receptacle and provided with a vertically-disposed rod adjustably secured to the head of the screw-rod, the said displacer moving with the gasometer-bell, and causing the water to rise and fall in unison in the generator and water-receptacle, substantially as shown and described.

3. An acetylene-gas generator, provided with a gasometer, a generator-casing adapted to contain water, a basket removably held in said generator and adapted to contain calcium carbid, the calcium carbid being normally out of contact with the water, a pipe connection between said gas-generator casing and the bell of the gasometer, a receptacle in communication with the said casing and containing water rising and falling with the water in the generator-casing, a displacer movable in said receptacle, and a support for the said displacer carried by the gasometer-bell and adjustable horizontally, the said displacer being vertically adjustable in said support, substantially as shown and described.

4. An acetylene-gas generator, provided with a generator-casing adapted to contain water, a support for the calcium carbid within said casing, the carbid being normally out of contact with the water, a receptacle in communication with the said casing and containing water rising and falling with the water in the generator-casing, a displacer movable in said receptacle, for causing the water to rise and fall in the receptacle and casing according to the down-and-up movement of said displacer, a gasometer, and a support for the displacer carried by the gasometer-bell, the said displacer being adjustable in said support, substantially as shown and described.

5. An acetylene-gas generator, comprising a gasometer, a gas-generator adapted to contain water, a basket removably held in said generator and adapted to contain calcium carbid, a pipe connection between said gas-generator and the bell of the gasometer, a receptacle containing water and connected by a pipe with the generator so that the water in the generator stands at a level with the water contained in the receptacle, a displacer comprising a closed vessel adapted to move loosely in the said water-receptacle so that the levels of the water in the generator and receptacle change in unison, a screw-rod secured in bearings on the top of the gasometer-bell, and formed on its outer end with a head, a vertically-disposed rod secured at its lower end to the displacer and adjustably secured at its upper end to the head of the screw-rod, and a separator contained in the gasometer and into which passes the gas from the generator, said separator having an outlet-pipe, opening into the bell of the gasometer, substantially as shown and described.

6. An acetylene-gas generator, provided with a gasometer, a generator-casing adapted to contain water and calcium carbid, a lid therefor, a pipe for conveying the generated gas from the generator-casing to the gasometer-bell, the pipe carrying the said lid, a water-receptacle communicating with the generator-casing, a displacer movable in said receptacle, an adjustable support for the displacer carried by the gasometer-bell, and means for adjustably securing the displacer in said support, substantially as shown and described.

7. An acetylene-gas apparatus comprising a gasometer, a plurality of generators adapted to contain water and calcium carbid and communicating with said gasometer, receptacles adapted to contain water and communicating with the respective generators, the said receptacles being located at opposite sides of the gasometer, and displacers carried by the gasometer-bell at opposite sides thereof and movable in the said receptacles to move the water in and out of contact with the calcium carbid, the oppositely-arranged displacers serving to balance the gasometer-bell and adapted to be weighted to increase the pressure on the gas within the bell, substantially as described.

8. In a gas-machine, a gasometer, a water-tank arranged at one side thereof, a generator in the tank, a water-weighted displacement-plunger supported on one side of the gasometer-bell and movable in the water-tank, and a weight carried on the opposite side of the gasometer-bell, substantially as specified.

OLIVER DERVIN FRY.

Witnesses:
JAS. ACKERS,
JOHN ED. ACKERS.